(12) United States Patent
McEvers (10) Patent No.: US 6,239,365 B1
(45) Date of Patent: May 29, 2001

(54) SEALABLE ELECTRICAL OUTLET ENCLOSURE

(76) Inventor: Douglas W. McEvers, 8685 Black Maple Dr., Eden Prairie, MN (US) 55344

( * ) Notice: Subject to any disclaimer, the term of this patent is extended or adjusted under 35 U.S.C. 154(b) by 0 days.

(21) Appl. No.: 09/315,677

(22) Filed: May 20, 1999

(51) Int. Cl.$^7$ ........................................................ H01J 5/00
(52) U.S. Cl. ............................ 174/50; 174/58; 220/4.02; 29/854
(58) Field of Search .................... 174/48, 50, 58, 174/63, 60, 135, 53; 220/3.3, 4.02, 3.2; 248/906; 29/854, 868, 825; 361/826

(56) References Cited

U.S. PATENT DOCUMENTS

| | | |
|---|---|---|
| 3,701,451 | 10/1972 | Schindler . |
| 3,740,451 | 6/1973 | Schindler . |
| 3,773,968 | 11/1973 | Copp . |
| 3,873,759 | 3/1975 | Schindler . |
| 3,895,732 | 7/1975 | Robinson . |
| 4,158,420 | 6/1979 | Balkwill . |
| 4,265,365 | 5/1981 | Boteler . |
| 4,345,693 | 8/1982 | Balkwill . |
| 4,408,696 | 10/1983 | Crosson . |
| 4,673,097 | 6/1987 | Schuldt . |
| 4,757,158 | 7/1988 | Lentz . |
| 4,794,207 | * 12/1988 | Norberg et al. .................... 174/53 X |
| 4,796,159 | * 1/1989 | Miksche ................. 361/832 |
| 4,952,754 | 8/1990 | Rye . |
| 5,189,256 | * 2/1993 | Epple ..................................... 174/50 |
| 5,239,128 | * 8/1993 | Golden et al. ......................... 174/50 |
| 5,272,279 | * 12/1993 | Filshie ............................... 220/3.2 X |
| 5,350,884 | * 9/1994 | Littrell ................................. 174/48 |
| 5,568,362 | * 10/1996 | Hansson ................................ 174/50 |
| 5,661,264 | * 8/1997 | Reiker ............................. 248/906 X |
| 6,005,188 | * 12/1999 | Teichler et al. ......................... 174/50 |

* cited by examiner

*Primary Examiner*—Dean A. Reichard
*Assistant Examiner*—Dhiru R Patel
(74) *Attorney, Agent, or Firm*—Moore & Hansen (57) ABSTRACT

A sealable electrical junction box of one piece unitary construction which incorporates one or more sealing chambers through which one or more electrical wires can pass before they reach the main chamber of the inside of the box. These chambers may then be filled with an expandable foam sealant to form an airtight seal around wires. A flange around the outside of the box allows a vapor barrier to be sealed to the box, so that an airtight seal may be formed around the outside of the box. When properly installed, no air or water vapor can pass from the inside of a building to the outside around or through the sealable electrical junction box.

22 Claims, 9 Drawing Sheets

SEALABLE ELECTRICAL OUTLET ENCLOSURE

BACKGROUND OF THE INVENTION

Residential and commercial building codes have been changing in recent years to require higher levels of efficiency in the heating and cooling of buildings. The most effective way to lower heating and cooling costs is to raise the level of insulation in walls and ceilings and to suppress the movement of air known as infiltration. In typical residential construction, insulation, generally batts of fiberglass insulation, is used to fill the space between the studs, thereby creating small pockets of immobilized air, which decrease the thermal conductivity of the walls. A vapor barrier, often a sheet of polyethylene, is then secured to the inside of each wall. In order to be completely effective, the vapor barrier must suppress the movement of air and water vapor through all of the walls, ceilings and floors of the building structure or residence so that a separate environment or envelope is created within the building structure. However, any penetrations or openings in the vapor barrier provide passage ways for water vapor or conditioned air. Because of the number of electrical outlet boxes that are used in modern homes, and the need to penetrate the vapor barrier to provide electricity using state of the art electrical outlet and electrical junction boxes, there is great potential for the creation of a significant number of passage ways in the vapor barrier for infiltration or escape of water vapor or conditioned air, resulting in an inability to adequately provide such a separate environment and an inability to adequately provide for efficient control of the environment within the building structure.

Figure 10:
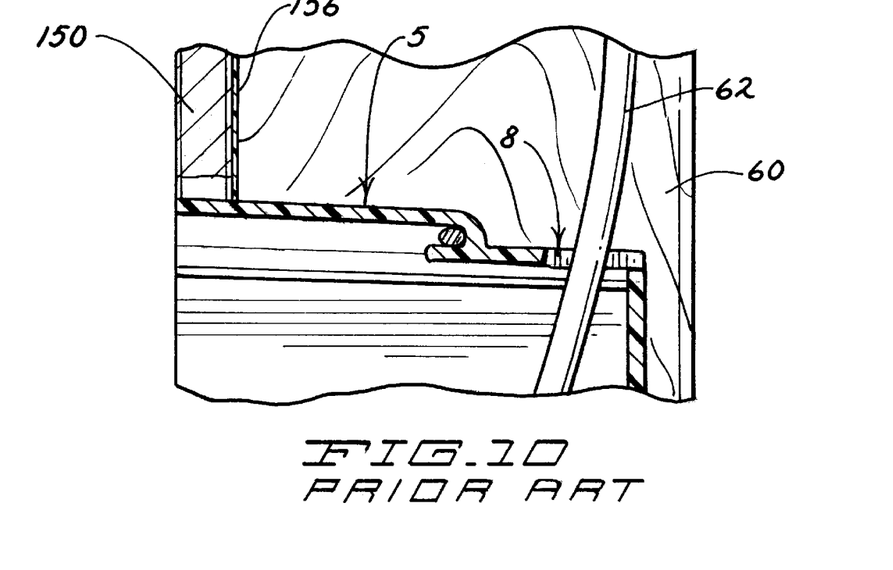
FIG. 10 is a close-up partial cross-sectional side view corresponding to the view shown in FIG. 8, but showing a prior art box.
Figure 11:
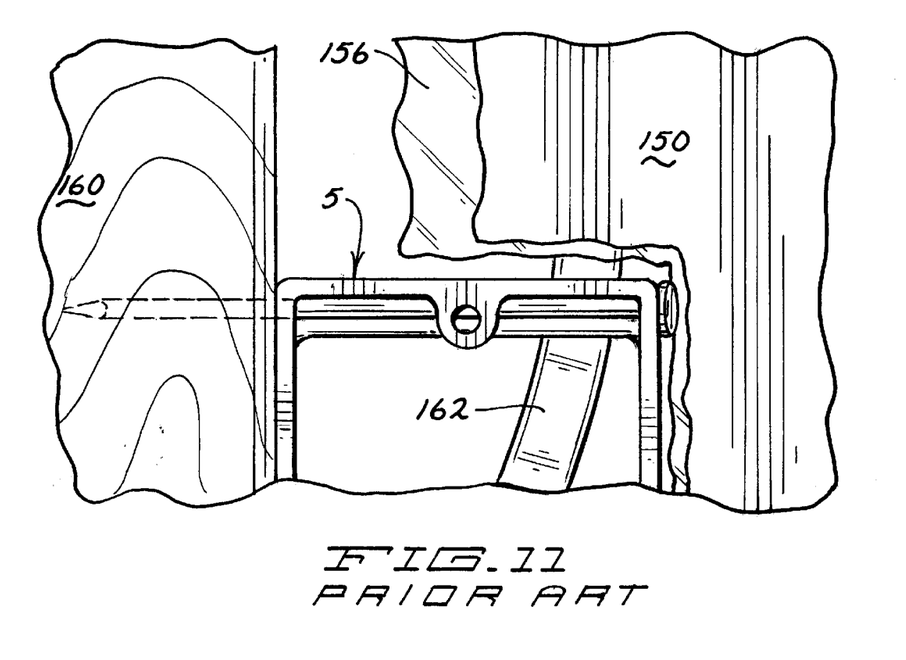
FIG. 11 is a partial close-up front view of the installed prior art box shown in FIG. 10, but in a view similar to that shown to that shown in FIG. 9.

In building energy efficient housing, one faces many obstacles. The main obstacle is being able to find affordable and readily available components with which to complete the assembly of the structure. As noted above, one area requiring attention to detail is electrical outlets in exterior walls. The average new home has probably at a minimum 25 such exterior wall outlets and maybe as many as 50. Using conventional outlet boxes 5, shown in FIGS. 10 and 11, with air leaking in or out at all wiring perforations 8 and all around the front edge of the outlet box the inevitable heat loss is considerable.

Air flow, or the passage of air from one environment to another, occurs whenever there is a pressure gradient across a wall and a path for air to follow. Air is generally lost outwardly through the walls during heating seasons because, as the air inside the building is heated, the air pressure increases, creating a pressure differential which forces the heated air through any perforations in the vapor barrier. Just the reverse happens when it is warm outside and air conditioning is used on the inside to lower the temperature and, perhaps, the humidity. In this case, the inside of the building will actually have a negative pressure differential in relation to the outside environment, such that warm outside air may pass inside or infiltrate through any openings in the vapor barrier to balance the pressure differential. Whenever the inside air is heated or cooled, a pressure differential will be created between the inside environment and the outside environment causing a movement of air either inwardly or outwardly through any openings or penetration in the vapor barrier. This movement is further exacerbated by wind creating a positive pressure on the windward side and a negative pressure on a leeward side of a building.

Moisture, generally conveyed by the air, passes through walls in the same manner. Whenever there is a difference between the outside humidity and the level of humidity inside, a vapor pressure is established. This vapor pressure can be significant, especially during winter months in colder climates when the outside air is extremely dry. Under such conditions, the moisture inside the building is generally driven outside through any existing penetrations in the walls in response to a differential in the humidity level, regardless of the actual air pressure inside and outside of the building. In northern climates, where the outside temperature is below freezing, the effects of moisture passing through the walls can be very detrimental. As water vapor passes through a wall, the temperature in the wall will drop to the temperature outside of the building, from a temperature equal to that of inside the building, over the distance from the inside to the outside of the wall. Following the downward sloping temperature gradient, the moisture in the air first condenses into water droplets. At some point in the wall, the temperature drops below freezing and an ice barrier forms. This wall of ice not only results in destructive forces due to the expansion of the water as it freezes, but it also contributes moisture to rotting processes through moisture retention which continues to destroy wooden structures in the warmer periods of the year.

During warmer months, air movement through the walls can also result in the retention of moisture in some building materials due to their hygroscopic nature. Moisture passes through the walls and the backside of the siding material and often stops when it gets to painted surfaces. The moisture can then build up between the paint and the backside of the siding, causing the paint to blister and peel. Damage of this kind, along with the increased heating and cooling costs associated with air and water vapor infiltrations and escapes of the kind seen in typical residential housing, have led to many of the changes in building codes which have occurred in recent years.

It will be understood therefore, that in order to efficiently control the temperature and moisture levels in both residential and commercial building structures, and in order to prevent damage to structural aspects of the respective buildings, there is a need for a way to stop the passage of air and moisture through the walls of building structures . More specifically, in order to do this, there is a need to prevent the loss of vapor barrier integrity through and around electrical outlet and electrical junction boxes. Many attempts have been made to effectively and efficiently stop air movement at electrical outlet boxes.

Some builders use conventional electrical outlet boxes in conjunction with a separate poly box with a flange to provide a means to fasten the vapor barrier to the outlet box. This system requires two separate components, however. Another method is an outlet box with a ring that makes a seal between the vapor barrier and the electrical box, and the wiring penetrations are sealed with a neoprene strip. The problem with this system is that drywall applicators typically use a router to cut outlet openings and the vapor barrier will be cut and destroyed around the entire perimeter of the outlet box. Still another method is a one piece electrical box with a flange for making the connections between the vapor barrier and outlet box. This system does not adequately address the electrical penetrations at the rear of the box where a significant amount of air leakage can occur. These attempts have been largely unsuccessful at either stopping the air flow near the wiring or around the box, or at providing a cost-effective solutions which can be installed quickly and easily, so as to be more likely to be effectively used.

A number of patents disclose similar solutions to these problems. Balkwill et al. (U.S. Pat. No. 4,158,420) disclose the use of conventional electrical outlet boxes in conjunction with a thin flexible cover. After the outlet box is installed, the thin plastic cover is placed over the box and nailed to a stud. Holes are then punched through the thin plastic to receive the wires. A true vapor seal is not achieved either around the box or around the wires.

Lentz U.S. Pat. No. 4,757,158) teaches the use of rigid boxes with flanges that cover a conventional electrical outlet box. The flanges provide a surface on which the vapor barrier can be glued, providing an effective seal around the boxes. However, like the Balkwill solution, air can still flow where the wires penetrate the boxes. Furthermore, each of these solutions require two components, resulting in increased installation time.

Schuldt (U.S. Pat. No. 4,673,097) discloses a single component system which attempts to address the vapor barrier problem by providing an integrally molded flange to which a sheet of polyethylene can be sealed. Unfortunately, this system does not provide any measure for eliminating the air flow adjacent to the wires passing through the knockout opening in the back of the box.

Rye (U.S. Pat. No. 4,952,754) teaches a unitarily constructed outlet box with a front opening that can receive a flexible ring after the vapor barrier has been placed over the opening. The ring is used to attach the vapor barrier to the outlet box. The problem with this solution is, with the absence of a flange, the vapor barrier is forced through the rough, hole routered in the drywall to allow access to the outlet, and is often damaged in the process. In addition, the outlet box does a poor job of forming a seal around the wires. This system relies on the use of a neoprene strip to cover the knockout holes. When the wiring is installed, the strip is to be cut to allow the wires to pass through. The discretion of the wiring installer is the determining factor in the size of the perforations, leaving significant room for installer error or non-performance. Furthermore, this is a relatively labor intensive system which makes it more expensive to the consumer, raising the cost of new housing and thereby creating incentives for unscrupulous installers and/or builders to neglect the attention to detail required to properly utilize this system to minimize air infiltration in the envelope created in the new building structure.

It will be appreciated from the foregoing that prior art devices present problems which are in need of solutions. The present invention provides solutions for these and other problems.

SUMMARY OF THE INVENTION

This has lead to the development of a unique electrical junction enclosure device that will be a one piece structure, preferably provide a flange on which to seal the vapor barrier, and provide a first chamber and a second chamber through which the electrical wires will pass near the rear of the outlet box for the electrical junction. The first chamber can be filled with an expanding foam after the wiring has been passed through the chamber. The preferred device provides a flange and a plurality of chambers including a main electrical junction chamber and a sealing chamber. Preferred embodiments will have separate sealing chambers at the top and bottom of the outlet box, which when filled with the proper sealing medium, will provide an airtight seal between the electrical wires and the outlet box thus eliminating air movement through the device. This one device will have an ease of installation similar to that of any conventional outlet box, will accommodate standard building practices, and allow the user to easily provide an airtight seal at all electrical outlet boxes. Because this device is of one piece construction, it can be manufactured economically, and because it installs like conventional outlet boxes, it will provide for economy in the installation. Once in place, the installer will find making the airtight seal at the outlet box a simple procedure using commonly used materials. Typically, TREMCO™ Acoustical Sealant, 3M® tape, or the like would be used to seal the vapor barrier to the flange and an expanding foam made by any number of companies, would be used to fill the first chamber, or a plurality of sealing chambers in preferred embodiments, through which the electrical wires pass. This device will be manufactured economically, easily installed and provide the highest level of air tightness.

It is a primary object of this invention to provide a sealable electrical junction box which is formed from a single mold.

It is another object to provide a sealable electrical junction box which is a one component system.

It is a further object to provide a sealable electrical junction box that can be installed like a conventional outlet box.

It is another object to provide a sealable electrical junction box that utilizes a typical knockout structure that is familiar to those in the field and will require no special handling or tools when installing the wiring.

It is also an object to provide a sealable electrical junction box that utilizes a flange which has been commonly used and proven effective to seal the vapor barrier around the outside of the box.

The instant invention comprises an electrical junction box which is of unitary construction and shaped to allow an airtight seal around the front opening and around the wire penetration areas when the box is fully installed. The outlet box is installed like conventional boxes and requires no special tools or training.

The electrical junction box has a closed back and sides and a front side with a front opening. The sides are closed by side walls with interior and exterior surfaces. The back is closed by a rear wall also with an interior and exterior surface. First walls define the top and bottom of the box. Alternatively, these first walls can be an upper wall and a lower wall, each with interior and exterior surfaces. Dividing or second walls are used to create small cavities through which the wires must pass when the box is installed.

With the wires in place, the cavities can be filled with a sealing substance in order to create an airtight seal around the wires. The box incorporates first chamber access points and second chamber access points which comprise access openings, openings covered by tape or the like similar to that disclosed by Rye or most preferably, knockout areas which can be easily destroyed in order to form openings or holes for the wires. The knockout areas are defined by areas of reduced wall thickness as compared to the surrounding areas of the respective wall.

The box has side flanges which extend upwardly and downwardly from one of the side surfaces. These side flanges allow the box to be fastened to the side of a stud in the wall and will preferably have notches or holes to accommodate a fastening means such as nails or screws.

The box preferably includes a flange proximate the front opening which can be used to form an airtight seal with the vapor barrier around the front opening of the box. The plane of the flange is substantially parallel to the plane of the front opening and provides a flat surface onto which the vapor barrier may be glued. After the box is fastened to the side of a stud such that the front opening of the box faces into the room, the vapor barrier is applied to the wall and sealed to the outlet box or boxes. Most commonly, sheet rock is then applied to the wall over the vapor barrier, closing the wall. A hole cut through the sheet rock is aligned over the outlet box to accommodate the front opening. The flange proximate the front opening is set back from the front opening approximately the same distance as the width of the sheet rock such that, once the sheet rock is installed, the back face of the sheet rock is substantially flush with the flange and the front face of the sheet rock is substantially flush with the front edge of the box which defines the front opening.

In alternate embodiments, the box will be a round or "circular" box preferably for ceiling fixtures, or "double-gang" or "side by side" "double" box. it will be appreciated that any number of "side by side" boxes are envisioned within the present invention.

The above described features and advantages, along with various other advantages and features of novelty, are pointed out with particularity in the claims of the present application. However, for a better understanding of the invention, its advantages, and objects attained by its use, reference should be made to the drawings which form a further part of the present application, and to the accompanying descriptive matter in which there is illustrated and described preferred embodiments of the present invention.

BRIEF DESCRIPTION OF THE DRAWINGS

Referring to the drawings, where like reference numbers refer to like parts through the several views.

DETAILED DESCRIPTION OF THE PREFERRED EMBODIMENTS

With reference to the drawings, and first to FIGS. 1 through 9, there is shown a sealable electrical junction box 10, comprising a rear wall 20, two side walls 22a and 22b, an upper first wall 24, and a lower first wall 26. These walls are interconnected to form a substantially box-shaped exterior wall 28.

A chamber formed by the exterior wall 28 is divided into at least one first chamber 12, and a second chamber 14, by at least one dividing second wall 30. In the preferred embodiment shown in the drawings, there are two second walls, 30a and 30b forming two first chambers 12a and 12b. The second chamber 14, defined by the rear wall 20, the side walls 22a and 22b, and second walls 30a and 30b, is open opposite the rear wall 20 thereby forming front opening 16.

Junction box 10 further comprises a front flange 34 which extends outwardly and substantially perpendicularly from exterior wall 28. Front flange 34 is substantially parallel to the plane of the front opening 16 and is preferably set back therefrom to accommodate a layer of sheetrock 50. Front flange 34 may have one or more attachment holes 42 for the purpose of securing the box 10 to a stud 60 using nails, screws or other securing means. Front flange 34 is preferably wide enough to receive an adhesive 52 used to seal a vapor barrier 56 to the front flange 34.

A side flange 36 extends rearwardly from the front flange 34 and is flush with side wall 22a. Side flange 36 is at least long enough to have at least one attachment notch 40 which can be used to fasten the box 10 to the side of a stud 60. The attachment notches 40 may be used in conjunction with or instead of attachment holes 42. It is important to note that the terms notches and holes are used strictly for clarification and that the securing arrangements in either the front flange 34 or the side flange 36 or both, may be openings, notches, indentations, or any other configuration commonly used to accommodate securing means such as nails, screws, or the like.

The first walls 24 and 26 have first knockouts 32a which may be destroyed and removed by striking the knockout in a manner well known in the art in order to form one or more first access openings 33a through which the wires 62 could pass. These access openings 33 would then lead from the exterior to the first chamber 12. Note that this first chamber 12 could be toward the top or bottom of the box 10, or even toward the rear or sides of the box 10. The preferred embodiment shown in FIGS. 1–9 includes a first chamber 12a toward the top of the box 10 and a first chamber 12b toward the bottom of the box 10. All first chambers in any alternate embodiments would have either destroyable knockouts 32 or access openings 33 for receiving wires.

The second walls 30a and 30b also have destroyable second knockouts 32b, although they could have access openings for receiving wires. The second knockouts 32b can be destroyably removed to form one or more second access openings 33b which allow the wires 62 to pass from the first chamber 12, through the second wall 30, into the second chamber 14. Preferably, the first knockouts 32a substantially align with second knockouts 32b so that the wires 62 can pass through both without having to turn or bend, thereby simplifying installation.

The preferred junction box 10 includes attachment busses 43 adjacent the front opening 16 for receiving a conventional outlet cover (not shown). Preferably the box 10 has opposing busses 43 extending inwardly from the top and bottom of second chamber 14, and fixture holes 44 extending therethrough. These fixture holes 44 are preferably threaded to receive screws, or, alternatively, could be narrower than the intended screws used to fasten the outlet cover thereto such that the screws cut their own threads when screwed into the holes 44.

In preferred embodiments of the present invention, junction boxes 10, 110, 210, and 310 are injection molded out of a non-combustable, flame-retardant resin material such as the modified P.P.O. (polyphenylene oxide) resins sold by GE under the mark NORYL, or other similar resins which are known in the art.

It is envisioned that the preferred installation process would begin with placing the outlet box 10 against a stud 60 of an incomplete wall such that the side flange 36 abuts the side of the stud 60, the front flange 34 abuts the front of the stud 60 and the front opening 16 faces the inside of the room in which the outlet is to be used. In preferred embodiments, screws or nails would then be used to fasten the box 10 to the stud 60 through the attachment holes 42 and the attachment notches 40.

First knockouts 32a and second knockouts 32b would then be destroyed in order to form access openings 33a and 33b from the exterior of the box 10, so that the wire 62 can pass through the respective first wall 24 or 26, into the respective first chamber 12a or 12b, through respective second wall 30a or 30b and into the second chamber 14 for each wire 62 to be joined in the box 10. After the knockouts 32a and 33b are destroyed, the wires 62 are inserted through the respective access openings 33a and 33b so that the ends of the wires 62 extend well into the second chamber 14 leaving some excess for joining wires 62 as appropriate.

Figure 1:
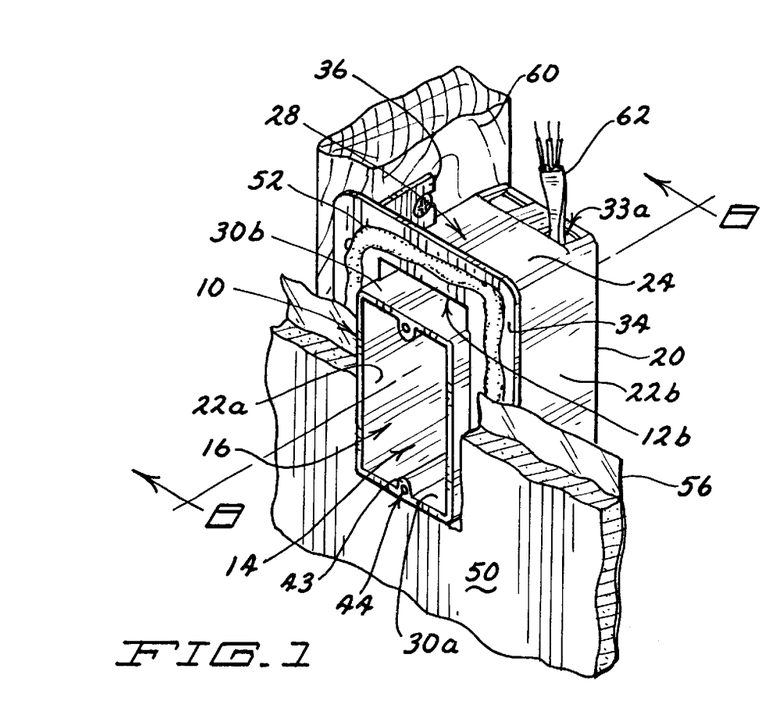
FIG. 1 is a perspective view of an installed junction box of the present invention with portions of the wall cut away to show how the box is mounted to the stud, how the vapor barrier seals to the front flange, how the wires extend through the knockout areas, and how the sheet rock sits against the vapor barrier and the front flange and is flush with the edge of the front opening.
Figure 2:
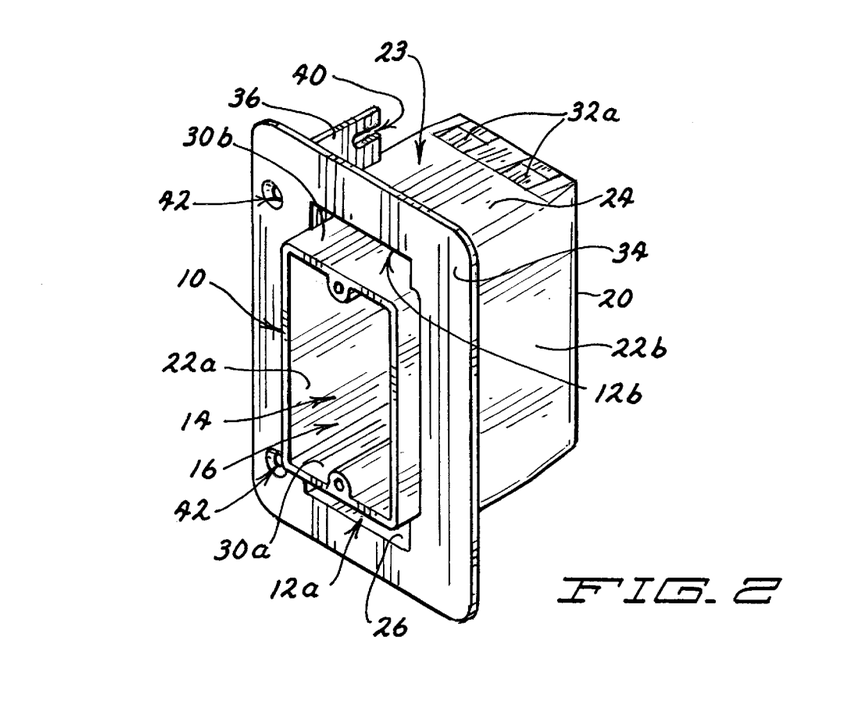
FIG. 2 is a perspective view of the uninstalled junction box of the present invention shown in FIG. 1.
Figure 3:
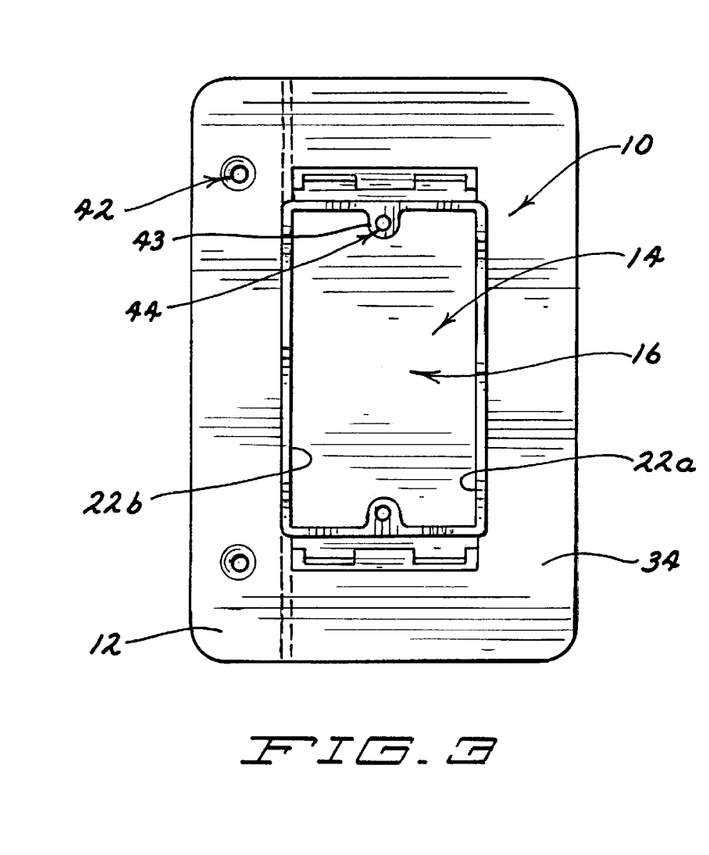
FIG. 3 is a front plan view of the uninstalled junction box of the present invention shown in FIG. 1.
Figure 4:
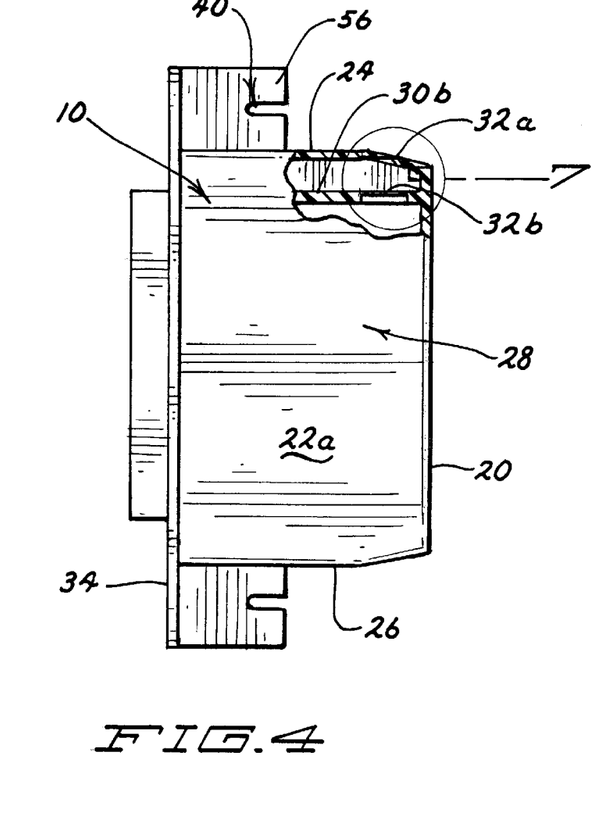
FIG. 4 is a partially cut-away side view of the uninstalled junction box shown in FIG. 1 with a cut-away view of a knockout area.
Figure 5:
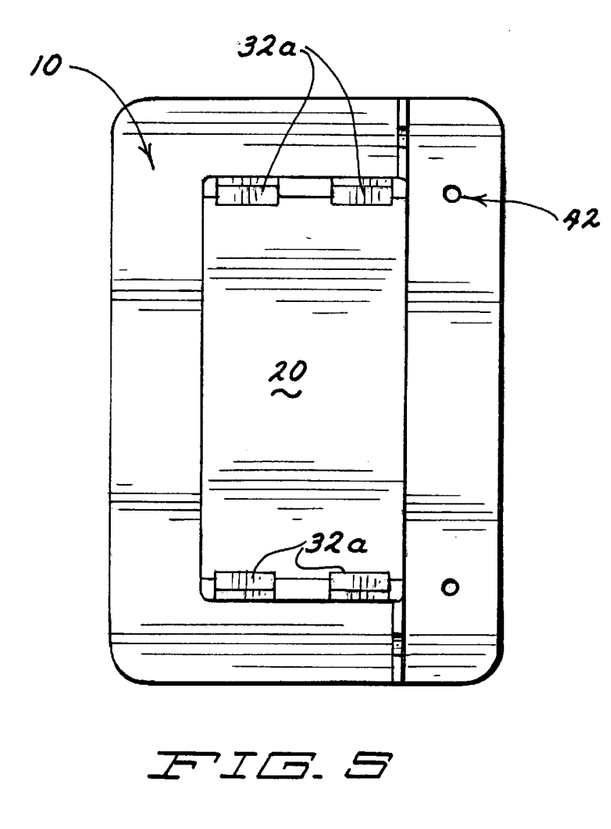
FIG. 5 is a rear view of the uninstalled junction box shown in FIG. 1.
Figure 6:
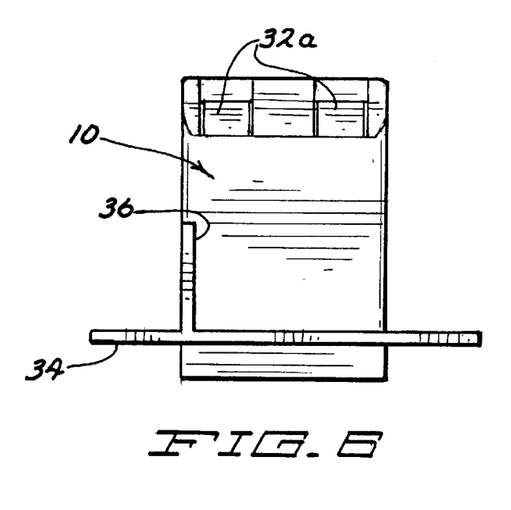
FIG. 6 is a top view of the uninstalled junction box shown in FIG. 1.
Figure 7:
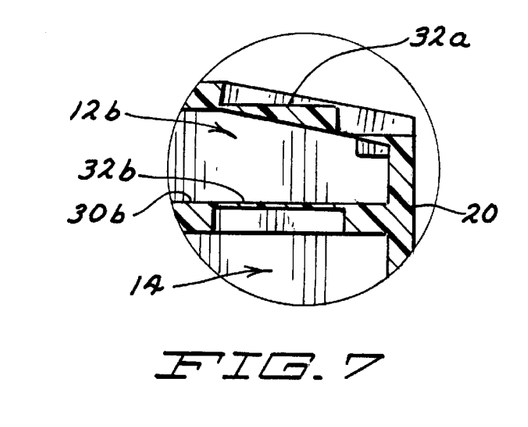
FIG. 7 is a close-up partial side view of the knockout area of the uninstalled junction box shown in FIG. 1.
Figure 8:
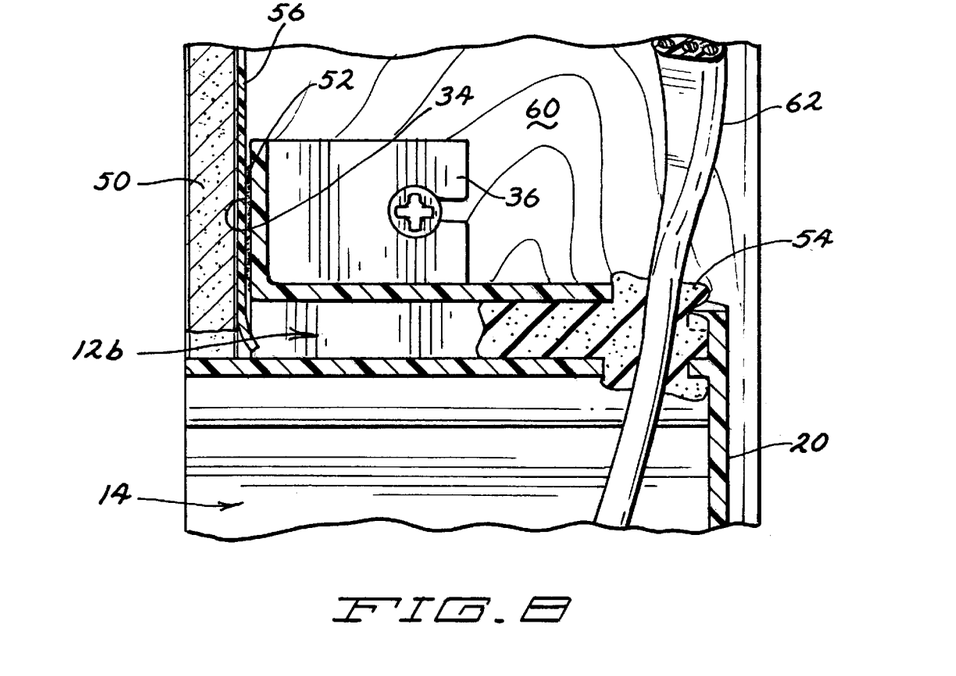
FIG. 8 is a close-up partial cross-sectional side view of generally from along lines 8—8 of FIG. 1, but after the box has been installed, showing how the wires pass through the knockout areas and how the first chamber is filled with sealant, forming an airtight seal around the wires.
Figure 9:
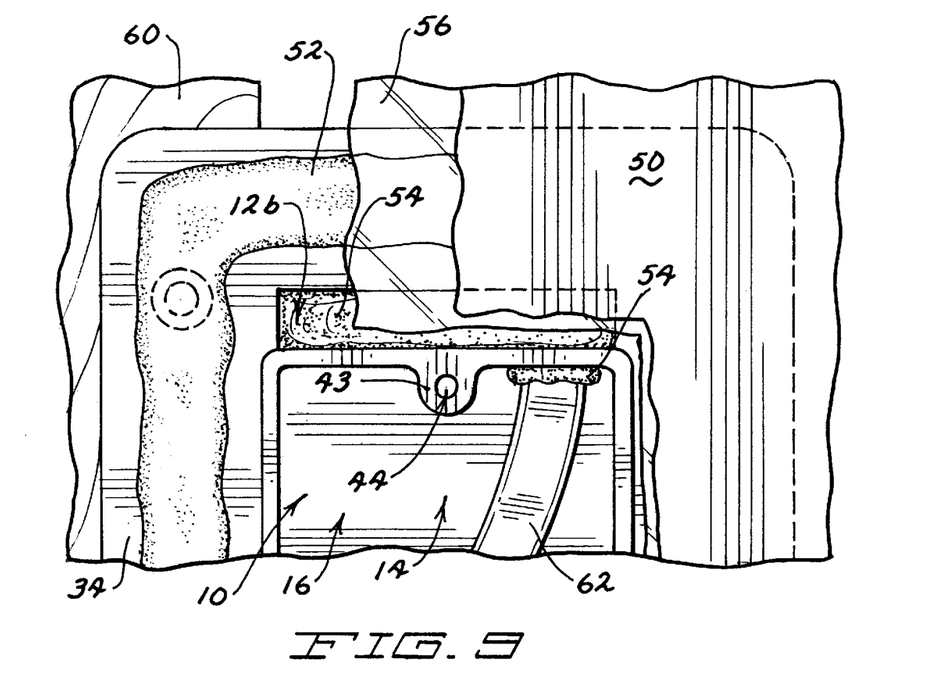
FIG. 9 is a close-up partial front view of an installed box of the present invention similar to the box shown in FIG. 1 showing a wire in place with sealant sealing the wire within the box and cutaway portions of vapor barrier and sheet rock against the front flange.

With the wires 62 in place, a sealant 54 is injected into the first chamber or chambers 12a and/or 12b, as appropriate where access openings in the box would allow air to pass through the box, thereby forming a substantially airtight seal around the wires 62 as shown in FIG. 8. Only those first chambers 12a and/or 12b having wires passing through them would need sealant 54 assuming the knockouts 32 remain intact where no wires are received. In alternate embodiments (not shown) where the boxes have preformed access openings in the place of knockouts then all first chambers 12 would require sealant 54 to provide an airtight box.

The next step in the preferred installation procedure is to apply a vapor barrier 56 over the wall. The vapor barrier 56 is secured to the outside of the front flange 34 with an adhesive or sealant 52. It is important that the sealant 52 be applied continuously around the perimeter of the flange 34 so that no air leaks form between the flange 34 and the vapor barrier 56. A hole is then cut in the vapor barrier 56 to substantially conform to the front opening 16.

Finally, sheetrock 50 with holes cut to conform to the box 10 and front opening 16 is placed over the vapor barrier 56 and secured to the studs, substantially completing the construction of the unfinished wall. An outlet fixture or cover (not shown) can be secured to the box 10 using the fixture holes 44 to receive screws or the like, presumably after the wall is finished. Installation according to this preferred procedure, should result in a virtually airtight seal across the vapor barrier 56 proximate the outlet box 10. This procedure is essentially the same for other embodiments of the sealable outlet and/or junction box of the present invention, unless access openings are pre-existing boxes. In that case, it would not be necessary to break the knockouts to create the access openings and care would need to be taken to seal all of the first chambers.

Figure 12:
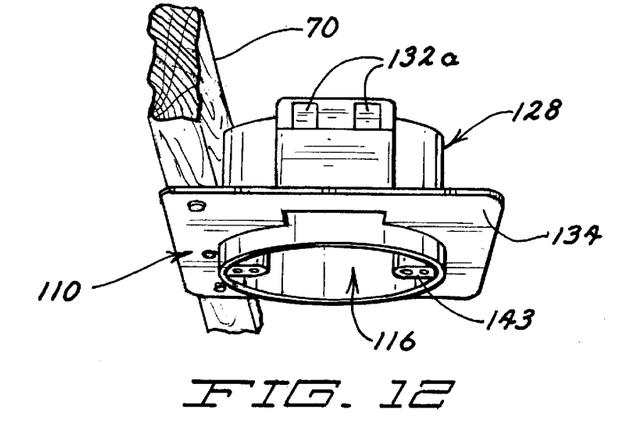
FIG. 12 is a perspective view of an alternate circular ceiling box of the present invention when secured to a ceiling joist.
Figure 13:
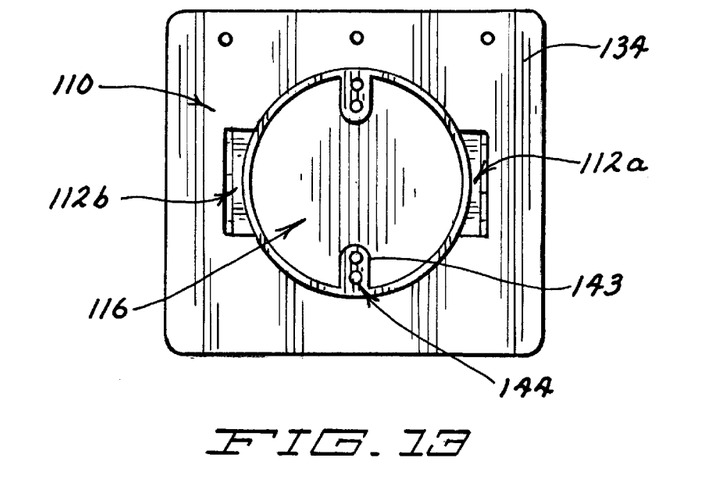
FIG. 13 is a bottom plan view of the alternate circular ceiling box shown in FIG. 12 but turned 90° from the general direction of the view shown in FIG. 12.
Figure 14:
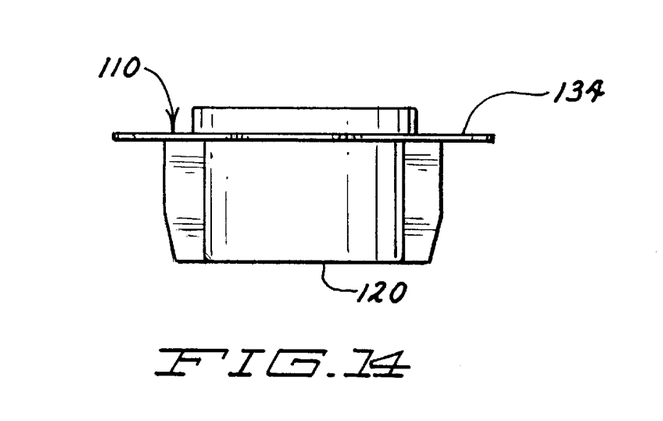
FIG. 14 is a side view of the alternate circular ceiling box shown in FIG. 13.
Figure 15:
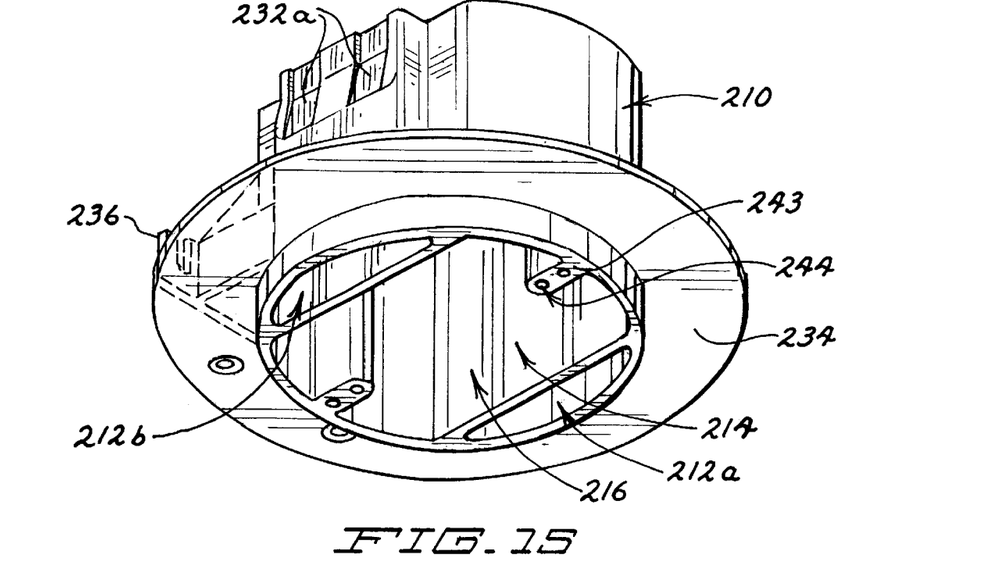
FIG. 15 is a perspective view of a preferred circular ceiling box of the present invention.
Figure 16:
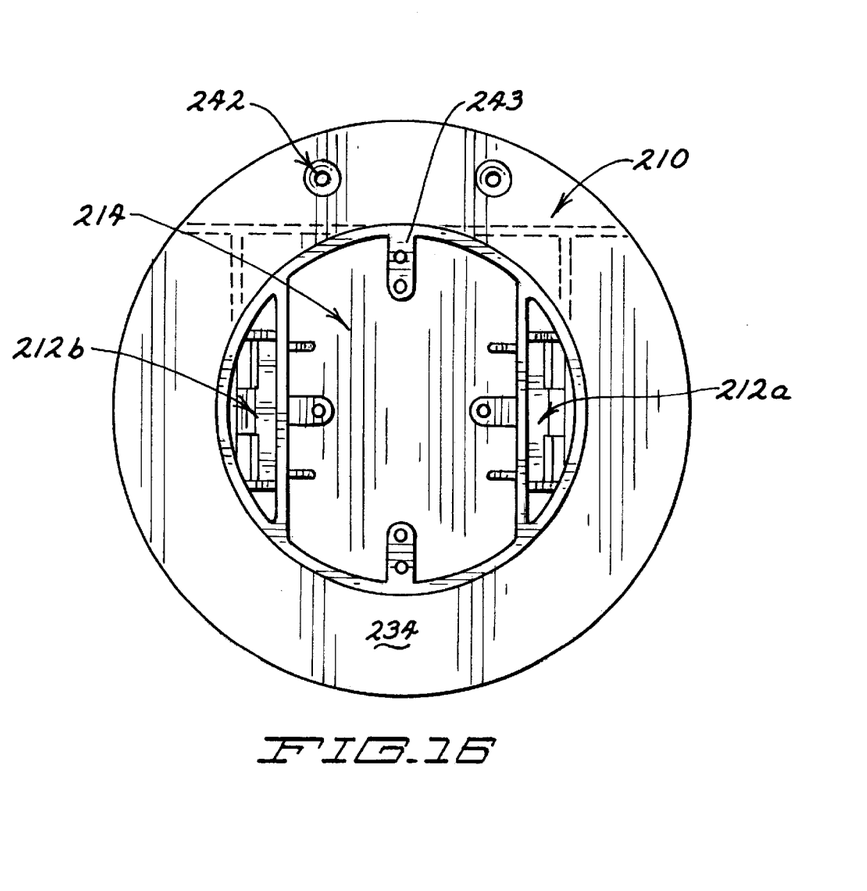
FIG. 16 is a bottom plan view of the circular ceiling box shown in FIG. 15.
Figure 17:
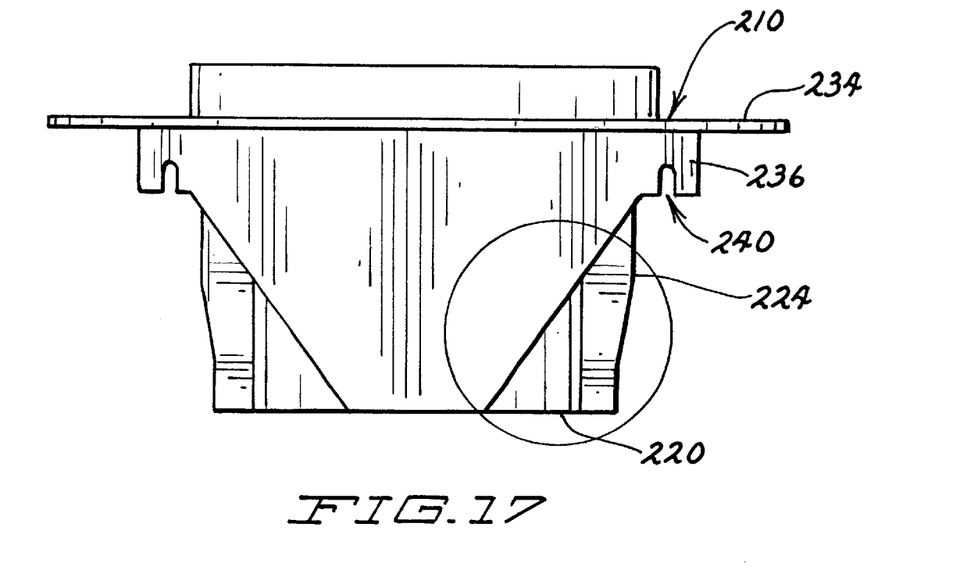
FIG. 17 is a side view of the circular ceiling box shown in FIG. 16.
Figure 18:
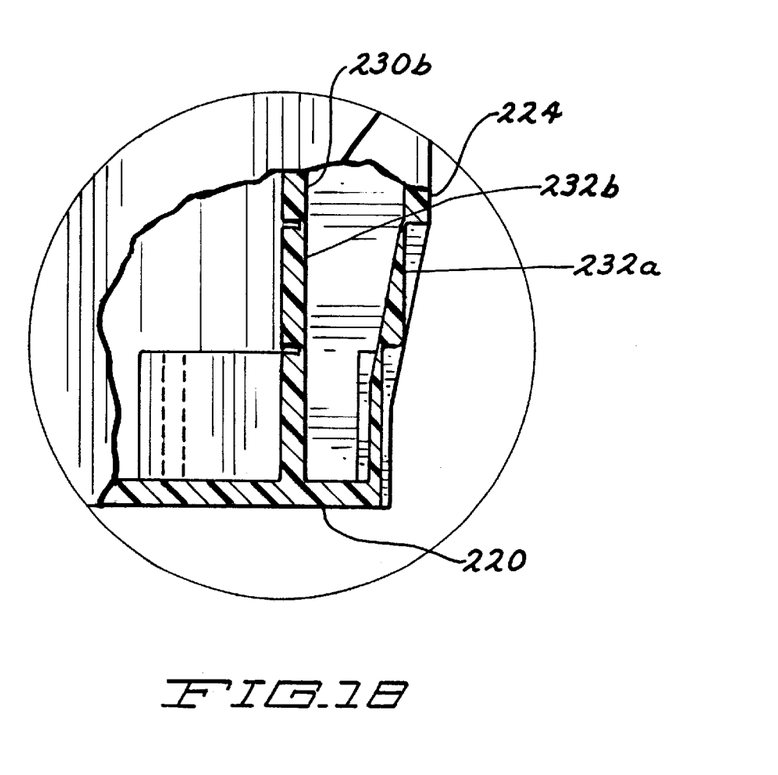
FIG. 18 is an enlarged partial side cut-away of the area within the highlighted circle shown in FIG. 17.
Figure 19:
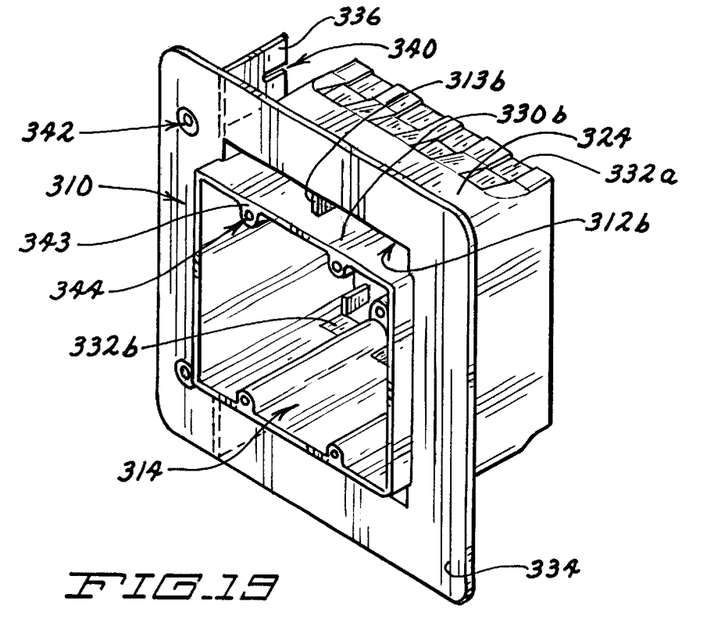
FIG. 19 is a perspective view of a preferred "double gang" junction box of the present invention.
Figure 20:
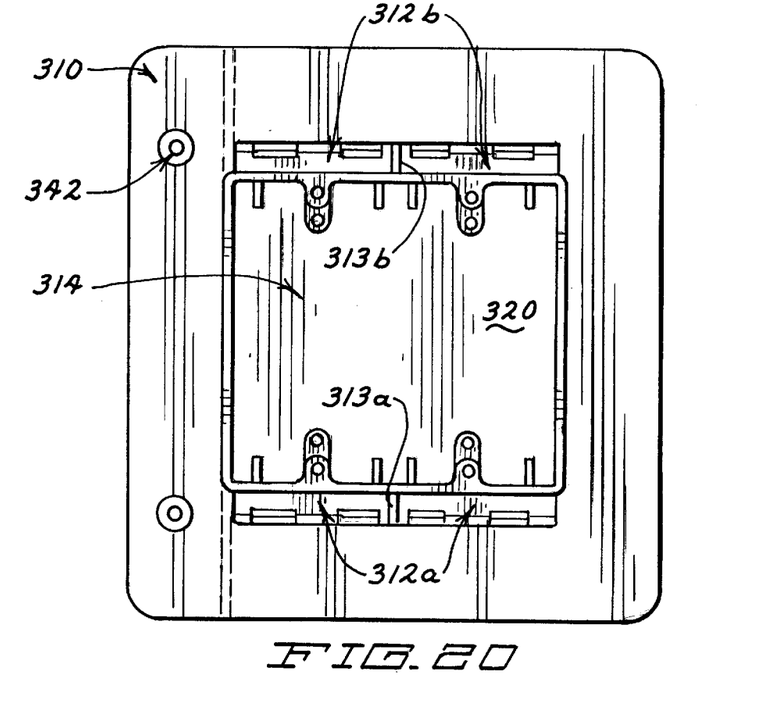
FIG. 20 is a plan view of open side of the box shown in FIG. 19.

Referring now to FIGS. 12–20, an alternate circular ceiling box 110 is shown in FIGS. 12–14; a preferred circular ceiling box 210 is shown in FIGS. 15–18; and a preferred "double-gang" junction box 310 is shown in FIGS. 19–20. Each of these additional junction boxes 110, 210 and 310 have many of the same elements as junction box 10 shown in FIGS. 1–9. The circular ceiling junction boxes 110 and 210 are designed for attachment to a ceiling joist 70 in a ceiling. The respective ceiling junction boxes 110 and 210 are configured somewhat differently, but each has a main chamber 114, 214 and opposing first chambers 112A and 112B, 212A and 212B, respectively. In addition, each of the respective ceiling boxes 110, 210 have corresponding knockouts 132A and 132A, 232A and 232B, which can be destroyed in the same manner as the knockouts 32A and 32B are destroyed. In addition, the installation of the ceiling boxes 110, 210 is generally similar to that of the installation of junction box 10 with the exception that the junction boxes 110, 210 are attached to a ceiling joist 70 in the process of completing construction of an unfinished ceiling (not shown). The preferred ceiling boxes will also have side flanges 136, 236 for attachment to a ceiling joist 70, front flanges 134, 234 to provide a surface to which to secure the vapor barrier (not shown), attachment busses 143, 243 having fixture holes 144, 244 and the like for securing outlet cover (not shown) or other fixture covers. It is appreciated that the ceiling junction boxes of the present invention may be used as a housing of one kind or another for any type of electrical junction where code requires an enclosure, including, without limit, a simple electrical junction between separate wires, a junction between electrical wires and a switch, a junction between electrical wires and an electrical outlet or outlets, a junction between an electrical wire and an electrical device which is powered by electrical power, such as a siren or other noise generating device, a light bulb and bulb socket or other light generating device, other like.

The "double-gang" junction box 310, shown in FIGS. 19–20 also has similar features to those associated with junction box 10 shown in FIGS. 1–9. The "double-gang" junction box 310 is installed in a manner which is almost identical to the manner in which the junction box 10 is installed, except that it is a double box and can, therefore, accommodate more than one junction or switch, etc. The "double-gang" junction box 310 has a front flange 334 which provides a surface to which the vapor barrier (not shown) may be sealed in a manner similar to which the vapor barrier is sealed to the other junction boxes 10, 110, 210 of the present invention. The "double-gang" box 310 also has a side flange 336 including notches 340 for securing the box 310 to a stud or joist (not shown). The "double-gang" box also includes a pair of side by side first chambers 312a, 312b on each side of the second or main chamber 314. The respective side by side first chambers 312a, 312b are separated from one another by a separating wall 313a, 313b, respectively. In this way, if the first and second knockouts 332a and 332b associated with only a single one of the side by side first chambers 312a, 312b are destroyed to form access openings (not shown), only one of the first chambers 312a, 312b in which the knockouts are destroyed to provide access openings for wires coming into the main chamber 314 through the access openings and the first chamber, will need to be filled with sealant (not shown) in order to seal the box 310 and provide the desired air tight vapor barrier.

It will be appreciated that the sealable junction box of the present invention envisions boxes which may accommodate even more junctions, switches, outlets or other electrically functioning devices then the "multiple-gang" junction boxes are well within the scope of the present invention.

It is to be understood that even though numerous characteristics and advantages of various embodiments of the present invention have been set forth in the foregoing description, together with details of the structure and function of various embodiments of the invention, this disclosure is illustrative only and changes may be made in detail, especially in matters of shape, size and arrangement of parts, within the principles of the present invention, to the full extent indicated by the broad general meaning of the terms in which the appended claims are expressed.

What is claimed is:

1. A sealable electrical junction box for receiving a sealant to provide a vapor barrier proximate an electrical junction between a plurality of electrical wires, the junction box having an interior and an exterior, the sealable electrical junction box comprising:

an enclosure having first and second walls and first and second chambers, the first and second chambers each communicating with the exterior, the first chamber being at least partially defined by a first wall separating the first chamber from the exterior, and by a second wall separating the first chamber from the second chamber, the first wall having a first knockout for anticipated destruction to permit passage of at least one of the plurality of electrical wires from the exterior into the first chamber through a first knockout access opening created by the destruction of the first knockout and defined by the remaining portions of first wall proximate the first access opening following the destruction of the first knockout, the second wall having a second knockout for anticipated destruction to permit passage of at least one of the plurality of electrical wires from the first chamber into the second chamber through a second knockout access opening created by the destruction of the second knockout and defined by the remaining portions of the second wall proximate the second knockout access opening following the destruction of the second knockout;

wherein following the destruction of the first and second knockouts and passage of at least one of the plurality of electrical wires from the exterior to the second chamber via the first chamber and the first and second knockout access openings, a vapor tight seal between the exterior and the second chamber can be formed by injecting the sealant into the first chamber such that the sealant engages portions of the first wall proximate the first access opening such that the passage of air through the first access opening is blocked.

2. The sealable electrical junction box of claim 1, wherein the box further includes a plurality of exterior walls and a flange extending outwardly from around the plurality of exterior walls, whereas once the box is secured to a building component intended to provide support for an exterior building wall, a membrane intended to cover an inside of the exterior building wall and provide a vapor barrier therefor, can be sealed to the flange.

3. A sealable electrical junction box for receiving a sealant to provide a vapor barrier proximate an electrical junction between a plurality of electrical wires, the junction box having an interior and an exterior, the sealable electrical junction box comprising a junction box having an exterior wall and a first interior wall, the junction box having first and second chambers open to the exterior on at least one side, the first and second chambers being separated by the first interior wall, the exterior wall having a first chamber access point proximate the first chamber, and the first interior wall having a second chamber access point proximate the first chamber access point, the first and second chamber access points each including an element selected from the group consisting of: (1) an access opening defined by the respective exterior or first interior wall in which the access point is included, (2) such an access opening covered by a membrane sealed to the box proximate the access opening and (3) a knockout portion in the respective exterior or first interior wall having an area of reduced wall thickness as compared surrounding areas of the respective wall, wherein the knockout portion is relatively easy to destroy to create an access opening; wherein a plurality of electrical wires can be passed through created or existing access openings in the exterior wall and the first interior wall such that they pass from the exterior, through the first chamber into the second chamber, and the sealant can be injected into the first chamber so as to engage portions of the exterior wall proximate the first chamber access point such that air passing from the first chamber to the exterior via the first chamber access point is blocked.

4. The sealable electrical junction box of claim 3, wherein the sealable electrical junction box includes a flange extending outwardly from around the exterior wall of the junction box, whereas once the box is secured to a building component intended to provide support for an exterior building wall, a membrane intended to cover the exterior building wall and provide a vapor barrier therefor can be sealed to the flange.

5. The sealable electrical junction box of claim 3, the junction box further including a third chamber open to the exterior, the third and second chambers being separated by a second interior wall, the exterior wall having a third chamber access point proximate the third chamber and the second interior wall having a second chamber access point proximate the third chamber access point, the third and second chamber access points each including an element selected from the group consisting of: (1) an access opening defined by the respective wall in which the respective access point is included; and (2) a knockout portion in the respective wall having an area of reduced wall thickness as compared surrounding areas of the respective wall, wherein the knockout portion is relatively easy to destroy to create an access opening; wherein a plurality of wires can be passed through the created or existing access openings in the exterior wall and the second interior wall such that they pass from the exterior, through the third chamber into the second chamber and a sealant can be injected into the third chamber so as to seal a portion of the third chamber and prevent air from passing from the exterior through the third chamber and into the second chamber.

6. A sealable electrical junction box for receiving both a plurality of electrical wires and a sealant to create a seal proximate the plurality of electrical wires, the junction box having an interior and an exterior, the electrical junction box comprising a partial enclosure having first and second chambers open to the exterior on one side, the electrical junction box having a first exterior wall and a first separating wall separating the first chamber from the second chamber, the first exterior wall and the first separating wall each having a chamber access point for gaining access into any adjacent chamber, each chamber access point including an element selected from the group consisting of: (1) an access opening defined by the respective first exterior or first separating wall in which the access point is included; (2) such an access opening covered by a membrane sealed to the box proximate the access opening; and (3) a knockout portion in the respective wall having an area of reduced wall thickness as compared surrounding areas of the respective first exterior or first separating wall; wherein the knockout portion is relatively easy to destroy to create an access opening; wherein at least one of the plurality of electrical wires can pass from the exterior, through an access opening in the first exterior wall to the first chamber and through an access opening in the first separating wall into the second chamber and a sealant can be placed in the first chamber such that air cannot pass from the first chamber to the exterior immediately proximate to any one of said electrical wires passing through the access opening in the first exterior wall.

7. The sealable electrical junction box of claim 6, the box having a second exterior wall, a second separating wall and a third chamber adjacent to the second chamber and open to the exterior, the third chamber being partially defined by the second exterior wall and the second separating wall separating the third chamber from the second chamber, the second exterior wall and the second separating wall each having chamber access points.

8. The sealable electrical junction box of claim 6, the box having a flange secured to an outside of the first exterior wall and a continuing series of interconnected exterior walls which, with the first exterior wall, encircle the first and second chambers, the flange extending outwardly from the exterior walls, whereas once the box is secured to a building component intended to provide support for an exterior building wall, a membrane intended to cover an inside of exterior building wall and provide a vapor barrier therefor, can be sealed to the flange.

9. A sealable electrical junction box for receiving a sealant to provide a vapor barrier proximate an electrical junction between a plurality of electrical wires, the junction box having an interior and an exterior, the sealable electrical junction box comprising:

an upper wall having an interior surface and an exterior surface, a lower wall opposite the upper wall having an inside surface and an outside surface, a back wall opposite the inside surface of the lower wall having interior and exterior surfaces, two side walls opposite each other, each having interior and exterior surfaces, the side walls interconnecting the upper, lower, and back walls, a rear wall having an interior and an exterior surface, the rear wall interconnected with the upper, lower, back and two side walls such that first and second chambers are formed which are open to the exterior opposite the rear wall, the first chamber defined by the outside surface of the lower wall and interior surfaces of the upper wall, the rear wall and the two side walls, and the second chamber defined by the inside surface of the upper wall and interior surfaces of the rear wall, the back wall and the two side walls, the lower wall separating the first chamber from the second chamber, passage means for allowing a plurality of electrical wires to pass from the exterior through the upper wall into the first chamber, and through the lower wall, into the second chamber, such that after the plurality of wires have been passed from the exterior through the upper wall into the first chamber, and through the lower wall, and into the second chamber, a sealant can be injected into the first chamber, forming a airtight seal between the exterior and the first chamber proximate said passage means.

10. The sealable electrical junction box of claim 9 wherein said passage means include a first access opening in the upper wall and a second access means in the lower wall.

11. The sealable electrical junction box of claim 9 wherein said passage means includes a first knockout area in the upper wall defined by an area of reduced wall thickness as compared to surrounding areas of the upper wall, wherein the knockout area is relatively easy to destroy to create an access opening, and a second knockout area in the lower area defined by an area of reduced wall thickness in the lower wall as compared to surrounding areas of the lower wall; wherein the second knockout area is relatively easy to destroy to create a second access opening.

12. The sealable electrical junction box of claim 9 wherein said passage means include an access opening in the lower wall defined by lower edges of the wall proximate the opening and a knockout area defined by an area of reduced thickness in the upper wall as compared to surrounding areas of the upper wall, wherein the knockout area is relatively easy to destroy to create the access opening.

13. The sealable electrical junction box of claim 9 wherein a flange extends outwardly from the exterior surfaces of the upper, back, and side walls proximate an opening of the first and second chambers on the front side thereof.

14. A method of constructing a building structure having reduced air infiltration, the method comprising the step of:

(a) providing a sealable electrical junction box for receiving both a plurality of electrical wires from the exterior and a sealant to create a seal proximate the plurality of electrical wires, the electrical junction box comprising a partial enclosure having first and second chambers open to the exterior, the partial enclosure including a first exterior wall and a first separating wall, the first chamber defined in part by the first exterior wall and second chamber being defined in part by the first separating wall separating the first chamber from the second chamber, the first exterior wall and the first separating wall each having a chamber access point for gaining access into any adjacent chamber, each chamber access point including an element selected from the group consisting of: (1) an access opening defined by the respective wall in which the respective access point is included, (2) such an access opening covered by a membrane sealed to the box proximate the opening and (3) a knockout portion in the respective wall having an area of reduced wall thickness as compared surrounding areas of the respective wall, wherein the knockout portion is relatively easy to destroy to create an access opening; wherein at least one of the plurality of electrical wires can pass from the exterior, through an access opening in the first exterior wall to the first chamber and through an access opening in the first separating wall into the second chamber and a sealant can be placed in the first chamber such that air cannot pass from the first chamber to the exterior immediately proximate to any electrical wire passing through the access opening in the first exterior wall;

(b) initiating construction of the building structure; and (c) installing the sealable electrical junction box within the building structure.

15. The method of claim 14 wherein the step of installing includes (1) securing the sealable electrical junction box to the building structure; (2) passing at least one of the plurality of electrical wires through a created or existing chamber access opening in the first exterior wall; and (3) adding a sealant to the first chamber such that such that air passing from the first chamber to the exterior via the chamber access opening is blocked.

16. The method of claim 15, the box having a knockout portion in the first exterior wall, wherein the step of installing includes destroying the knockout portion in the exterior wall prior to pass the at least one of the plurality of wires throughout the chamber access opening in the first exterior wall.

17. The method of claim 14, the box having a flange secured to an outside of the first exterior wall and a series of continuing exterior walls which, with the first exterior wall, continuously encircle the chambers within the box, the flange extending outwardly from the exterior walls, the step of installing including (1) securing the box to a building component intended to provide support for an exterior building wall; and (2) sealing to the flange a membrane intended to cover an inside of the exterior building wall and provide a vapor barrier.

18. The method of claim 14, the box having a third chamber adjacent to the second chamber and open to the exterior on one side, the third chamber being partially defined by a second exterior wall and a second separating wall separating the third chamber from the second chamber, the second exterior wall and the second separating wall each having chamber access points, wherein the step of installing includes (1) passing at least one of the plurality of electrical wires through a created or existing chamber access opening in the first exterior wall; and (2) adding a sealant to the third chamber such that such that air passing from the third chamber to the exterior via the chamber access opening in the second separating wall is blocked.

19. The method of claim 18, the box having a knockout portion in the second exterior wall, wherein the step of installing includes destroying the knockout portion in the second exterior wall prior to passing the at least one of the plurality of wires throught the chamber access opening in the second exterior wall.

20. A building structure comprising a sealable electrical junction box for receiving both a plurality of electrical wires from the exterior and a sealant to create a seal proximate the plurality of electrical wires, the electrical junction box including a partial enclosure having first and second chambers open to the exterior, the partial enclosure including a first exterior wall, a first separating wall, the first chamber defined in part by the first exterior wall and the first separating wall separating the first chamber from the second chamber, the first exterior wall and the first separating wall each having a chamber access point for gaining access into any adjacent chamber, each chamber access point including an element selected from the group consisting of: (1) an access opening defined by the respective wall in which the respective access point is included, (2) such an access opening covered by a membrane sealed to the box proximate the opening and (3) a knockout portion in the respective wall having an area of reduced wall thickness as compared surrounding areas of the respective wall, wherein the knockout portion is relatively easy to destroy to create an access opening; wherein at least one of the plurality of electrical wires can pass from the exterior, through an access opening in the first exterior wall to the first chamber and through an access opening in the first separating wall into the second chamber and a sealant can be placed in the first chamber such that air cannot pass from the first chamber to the exterior immediately proximate to any one of said electrical wires passing through the access opening in the first exterior wall.

21. The building structure of claim 20, the box having a third chamber adjacent to the second chamber and open to the exterior on one side, the third chamber being partially defined by a second exterior wall and a second separating wall separating the third chamber from the second chamber, the second exterior wall and the second separating wall each having chamber access points.

22. The building structure of claim 20, the box having a flange secured to an outside of the first exterior wall and a series of continuing exterior walls which, with the first exterior wall, encircle the chambers within the box, the flange extending outwardly from the exterior walls, whereas once the box is secured to a building component intended to provide support for an exterior building wall, a membrane intended to cover an inside of the exterior building wall and provide a vapor barrier therefor, can be sealed to the flange.

* * * * *